Jan. 26, 1960
J. A. SZLACHCIC
2,922,390
WEAR INDICATOR
Filed April 30, 1958
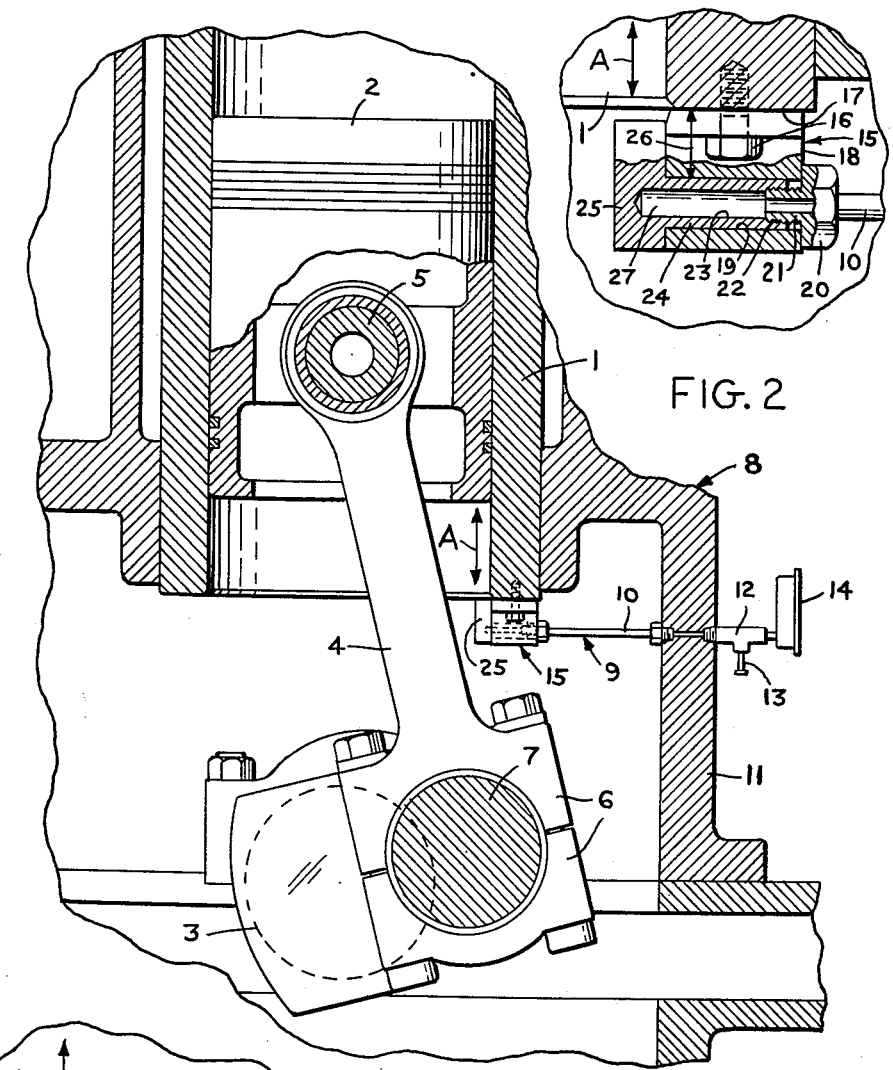
FIG. 2
FIG. 1
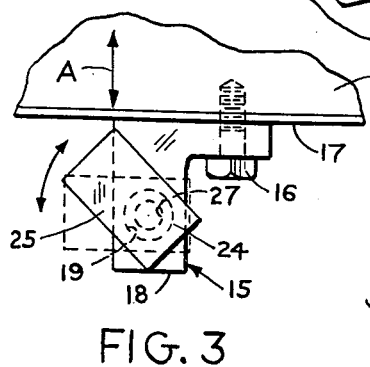
FIG. 3
JULIAN A. SZLACHCIC
INVENTOR.
BY Daniel A. Bobis
Atty

United States Patent Office 2,922,390
Patented Jan. 26, 1960

2,922,390

WEAR INDICATOR

Julian A. Szlachcic, Buffalo, N.Y., assignor to Worthington Corporation, Harrison, N.J., a corporation of Delaware Application April 30, 1958, Serial No. 731,970

6 Claims. (Cl. 116—114)

This invention relates to an improved signalling device of the type commonly provided on reciprocating engines to indicate excessive wear of the piston wrist pin and crankshaft bearings of these engines.

Basically conforming with general practice, this signalling device has an operable member which initially is set having a prescribed clearance below the piston at the bottom of its normal stroke, and thereafter adapted to be struck by the piston to indicate an abnormal piston stroke due to wrist pin and bearing wear exceeding this prescribed clearance.

However, as distinguished from general practice and as one of the principal objects of the present invention, the operable member provided is one more simply constructed and operated than any now in use.

More specifically, this operable member consists simply of a rotatable pin disposed normal to and extending into the path of movement of the piston, and on which there is an eccentric head. Operation thereof, consists simply of rotating the eccentric head into a position having the desired clearance from the piston conforming to the degree of wrist pin and bearing wear which it is intended to have the signalling device indicate.

This simply constructed and operating operable member will be better understood from the accompanying specification and drawings, in which:

Figure 1 is a side view partly in cross section of a conventional reciprocating engine showing the general location and arrangement of the signalling device thereon.

Figure 2 is an exaggerated view in the same perspective as Figure 1 of the portion of the signalling device which carries the operable member.

Figure 3 is a similarly exaggerated, but front view of the structure shown in Figure 2.

In Figure 1, only those elements of a conventional type reciprocating engine necessary to illustrate the present invention are shown. More particularly, these generally comprise a piston cylinder 1, in which a piston 2 is reciprocated by a rotating crankshaft 3 through a connecting rod 4. The connecting rod 4 is suitably journalled to the piston 2 by a wrist pin 5, and secured by cap bearings 6 to the crankpin 7 of the crankshaft 3 within the crankcase 8.

A signalling device, generally designated 9, is provided to indicate to the operator of the reciprocating engine a condition of wear of the piston wrist pin 5 and crankshaft cap bearings 6 approaching a degree which may cause engine damage. To carry out this intended function, this signalling device 9 is generally comprised of a pipe or flexible tube 10, in which a fluid, such as air, is normally contained under pressure, but thereafter when permitted to escape from the tube 10 is adapted to signal by its escape this advance condition of wear of the wrist pin and bearings. One end of the tube 10 is carried by a side wall 11 of the crank case 8 and communicates through a T 12 with a one way check valve 13 and a pressure gauge 14, the air being supplied into the tube 10 through the valve 13, and its pressure indicated by the pressure gauge 14.

As most clearly shown in Figure 2, the other end of the tube 10 is carried by an L-shaped member 15 connected by a screw 16 disposed through one leg thereof to the bottom 17 of the piston cylinder 1. The other, or vertically extending leg 18 of member 15 has a horizontal bore 19 therethrough, into which a pipe fitting 20 forming the end of the tube 10 is disposed. More particularly, a threaded extension 21 of this pipe fitting 20 engages a threaded end 22 of an internal bore 23 of a pin 24 also disposed in the horizontal bore 19.

This pin 24, constitutes the operable member of the signalling device 9, and has an eccentric head 25 on one end which extends into the path of movement of the piston 2, indicated in the drawings by the arrows A. More particularly, the distance 26 below the bottom of piston cylinder 1 at which the horizontal bore 19 is provided in the leg 18 of member 15, is so chosen to place the pin 24 in a position close to, but yet free of contact with the piston 2 at the bottom of its normal stroke. However, and as most clearly shown in Figure 3 the eccentric head 25 of the pin 24, is adapted by merely being rotated towards the piston 2, to provide a finer adjustment in this distance or clearance by which the piston 2 will normally miss striking the eccentric head 25.

To better understand the simplicity of operation of the operable member or pin 24 of the signalling device 9, let it be assumed that the reciprocating engine is not operating, but that the piston 2 thereof is at the bottom of is normal stroke. The L-shaped member 15 having the horizontal bore 19 at an appropriate distance below the bottom 17 of the piston cylinder 1 is then connected to the piston cylinder 1. The pin 24 having an eccentric head 25 and an internal bore 23 extending from one end and into this eccentric head 25, as at 27, is then disposed in this horizontal bore 19 thereby lying normal to the path of movement of the piston 2 with the eccentric head 25 extending into this path of movement. Before the pipe fitting 20 of the tube 10 is threadably engaged in the threaded end 22 of the internal bore 23, it will be appreciated that the pin 24 is free to rotate in the bore 19. Thus, depending on the degree of wrist pin and bearing wear which it is intended to have the signalling device indicate, a fine adjustment in the clearance of the piston 2 is made by merely rotating the eccentric head 25 towards the said piston. The pin 24 is then connected to the pipe fitting 20, which in addition to engaging the threaded end 22 of the pin internal bore 23 to support the end of tube 10, will also draw up on the pin 24 locking it in position. Air is then delivered into the tube 10 through the valve 13, and the pressure of this air indicated by the pressure gauge 14.

When during the course of operation of the reciprocating engine, the wear of the wrist pin 5 and bearings 6 exceed the clearance provided for the piston 2 as indicated above, the piston 2 at the bottom of its stroke will strike the eccentric head 25. As a result of this blow, the eccentric head 25 is sheared from the pin 24, thus allowing the air in the tube 10 to escape through the pin internal bore 23 causing a drastically reduced pressure reading on the pressure gauge 14. In this connection, it will be noted that in addition to serving as an escape passage for the air normally contained in the tube 10, the pin internal bore 23 also weakens the pin 24 in the plane in which it is sheared by the piston 2, thereby facilitating this shearing action.

It will be understood that the invention is not to be limited to the specific construction or arrangement of parts shown, but that they may be widely modified within the invention defined by the claims.

What is claimed is:

1. In the combination of an engine having a reciprocating piston and a rotating crank shaft and a fluid operated device to indicate wear of the wrist pin of said piston and of the bearings of said crank shaft, a rotatable pin for said device disposed normal to the direction of movement of said piston and located close to the piston at the bottom of its normal stroke, and an eccentric head on said pin rotatable towards the piston for making fine adjustments in the clearance between said piston and pin and adapted to be sheared from said pin by said piston during an abnormal stroke thereof, to thereby initiate a loss of fluid indicating a condition of wear exceeding this clearance.

2. That claimed in claim 1 wherein said pin has an internal bore extending from one end thereof into its eccentric head, providing both an escape passage for the fluid and weakening the pin in the plane in which it is sheared by the piston.

3. That claimed in claim 2 wherein the end of said internal bore is threaded and engages suitable means adapted to draw up on the pin to thereby lock its eccentric head in any adjusted position.

4. The combination with a reciprocating engine and its piston cylinder, piston, connecting rod, and crank shaft, of a fluid operated wear-indicating device comprising an L-shaped member connected with a leg thereof flush against the bottom of said piston cylinder and the other leg extending parallel to the direction of movement of said piston, a rotatable pin disposed in a horizontal bore in said extending leg and extending into the line of movement of said piston, said extending end of said pin being close to the piston at the bottom of its normal stroke, and an eccentric head on said end of the pin adjustable by rotation to fix a predetermined clearance of a relatively narrow dimension between said piston and pin and adapted to be sheared from said pin by the piston during an abnormal stroke thereof, to thereby initiate a loss of fluid indicating wear of the wrist pin connecting said piston and connecting rod and of the bearings for said crank shaft exceeding this predetermined clearance.

5. That claimed in claim 4 wherein said wear-indicating device includes a tube containing fluid under pressure, means associated with said tube for detecting the loss of fluid therefrom, and means for connecting one end of said tube to the end of said pin remote from the eccentric head, and said pin has an internal bore extending from its end connected to the tube into its eccentric head to provide an escape passage for the fluid in the tube and to weaken the pin in the plane in which it is sheared.

6. That claimed in claim 5 wherein said means connecting the tube to the pin is adapted to threadably engage threads provided in the end of said internal bore and to draw up on said pin thereby locking its eccentric head in any adjusted position.

References Cited in the file of this patent

UNITED STATES PATENTS

| | | |
|---|---|---|
| 1,788,941 | Bradley | Jan. 13, 1931 |
| 2,435,343 | Downey | Feb. 3, 1948 |